United States Patent [19]
Fisher et al.

[11] Patent Number: 5,442,953
[45] Date of Patent: Aug. 22, 1995

[54] DYNAMIC COMMUTATOR PROFILE SYSTEM

[75] Inventors: William D. Fisher; Robert H. Hartmann, both of Erie, Pa.

[73] Assignee: General Electric Company, Erie, Pa.

[21] Appl. No.: 140,587

[22] Filed: Oct. 21, 1993

[51] Int. Cl.⁶ .......................................... G01B 7/34
[52] U.S. Cl. ...................................... 73/105; 82/900
[58] Field of Search ................. 73/105, 865.9, 866.5; 33/655, 656; 82/900

[56] References Cited

U.S. PATENT DOCUMENTS

| | | | |
|---|---|---|---|
| 2,271,637 | 2/1942 | Garrison et al. | 82/900 |
| 3,093,135 | 6/1963 | Hirschhorn | 82/900 |
| 3,303,731 | 2/1967 | Zawistowski | 82/900 |
| 3,434,086 | 3/1969 | Houpt et al. | 73/105 |
| 4,437,335 | 3/1984 | Gates | 73/105 |
| 4,442,576 | 4/1984 | Kitamura | 82/900 |
| 4,952,105 | 8/1990 | Kitamura | 82/900 |
| 5,103,701 | 4/1992 | Lundin et al. | 82/900 |
| 5,213,019 | 5/1993 | Carlyle et al. | 82/900 |
| 5,249,457 | 10/1993 | Minichan | 73/105 |
| 5,301,545 | 4/1994 | Meyer et al. | 73/105 |

*Primary Examiner*—Richard E. Chilcot, Jr.
*Assistant Examiner*—George M. Dombroske
*Attorney, Agent, or Firm*—Ann M. Kratz; Marvin Snyder

[57] ABSTRACT

A dynamic profiling system for measuring a profile of an outer surface of a moving motor component such as a commutator includes a movable probe assembly having a profile detecting probe and a probe cooling system for circulating a cooling liquid about the probe. The probe cooling system maintains the cooling liquid at a fixed temperature during circulation of the liquid. The detecting probe obtains profile measurement data from the outer surface of the rotating motor component when the motor component is at ambient and hot temperatures. Additionally data is collected while the commutator is rotating up to 4000 revolutions per minute. The system further includes a controller, an analog to digital converter for receiving and converting the data, and a monitor for displaying information processed by the controller. The controller directs a probe positioning device to reciprocally position the probe assembly relative to the moving motor component under test and a protective enclosure encloses the moving motor component while the test is in progress. An aperture in the protective enclosure allows the probe assembly to approach the moving motor component by passing through the aperture while a movable door can selectively block and unblock the aperture. A door sensor generates a door status signal to indicate the state of the door, wherein the controller receives the door status signal and generates a visual indication of the door status signal in response thereto.

20 Claims, 5 Drawing Sheets

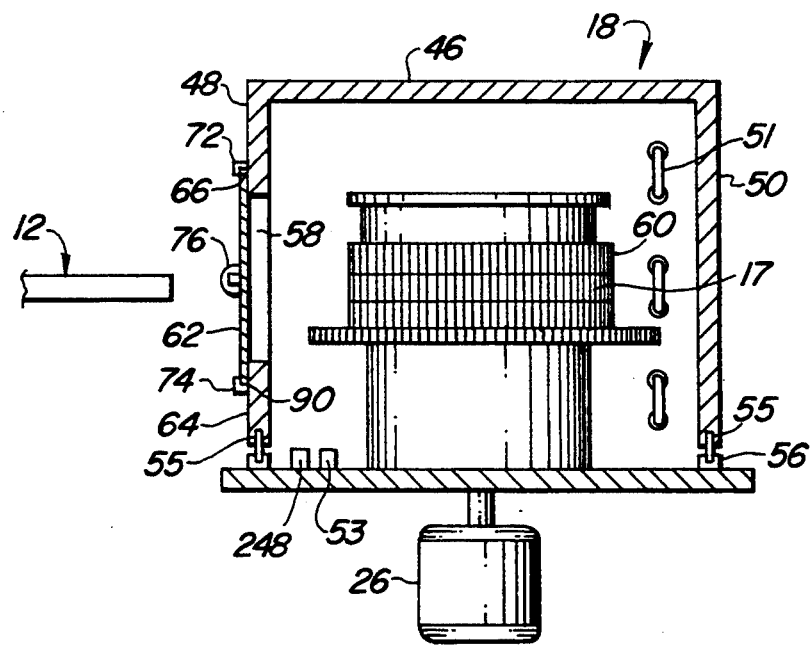
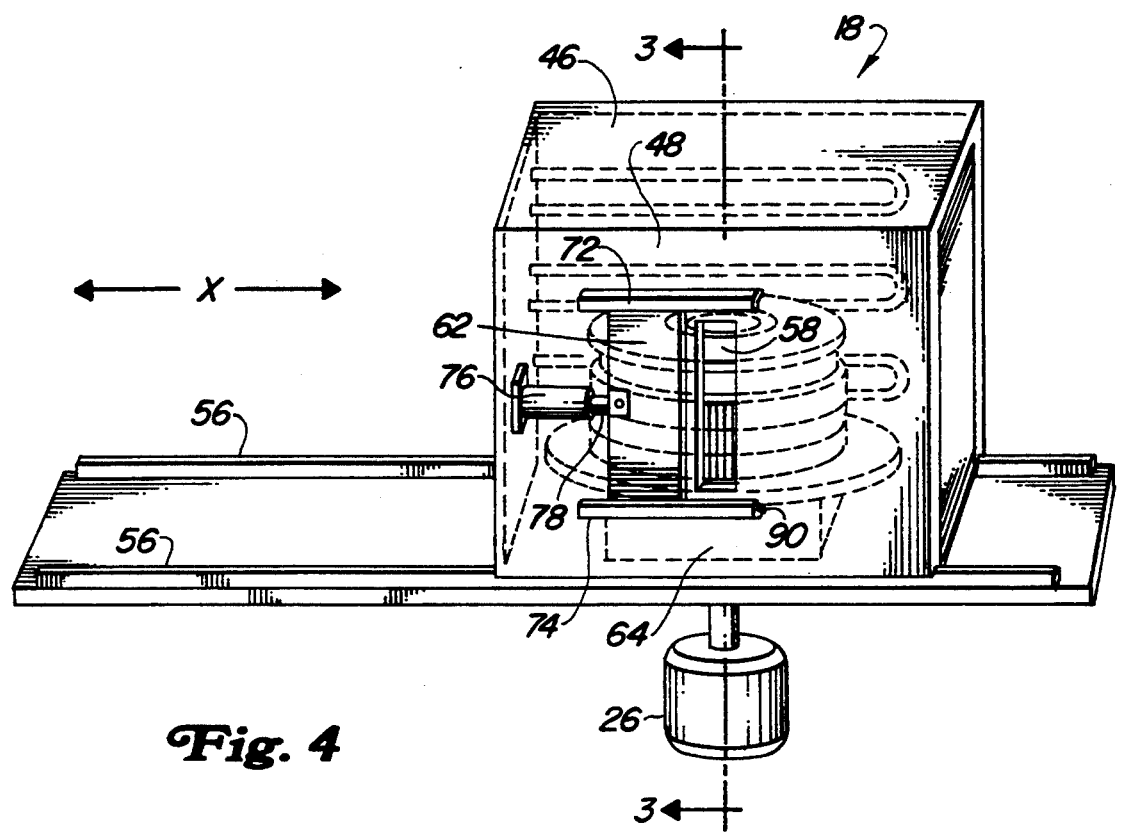

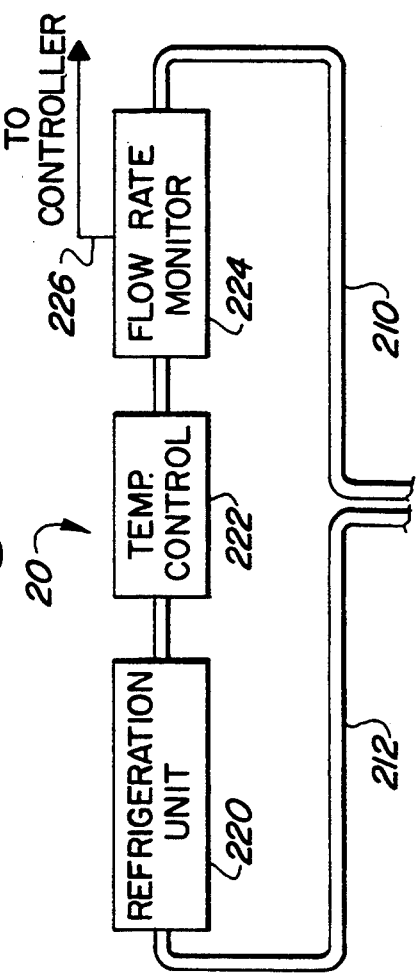
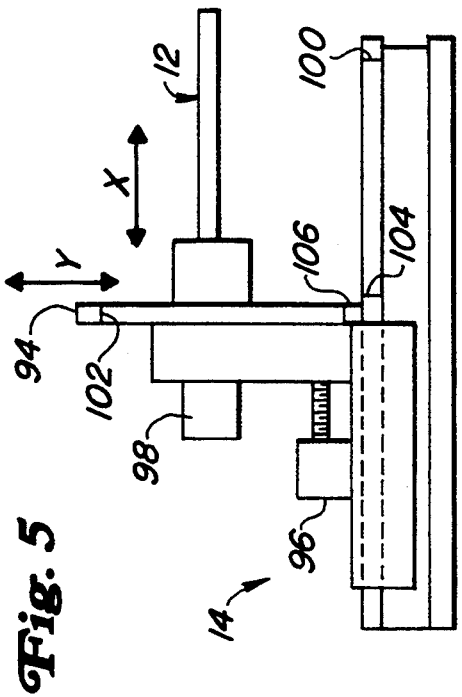
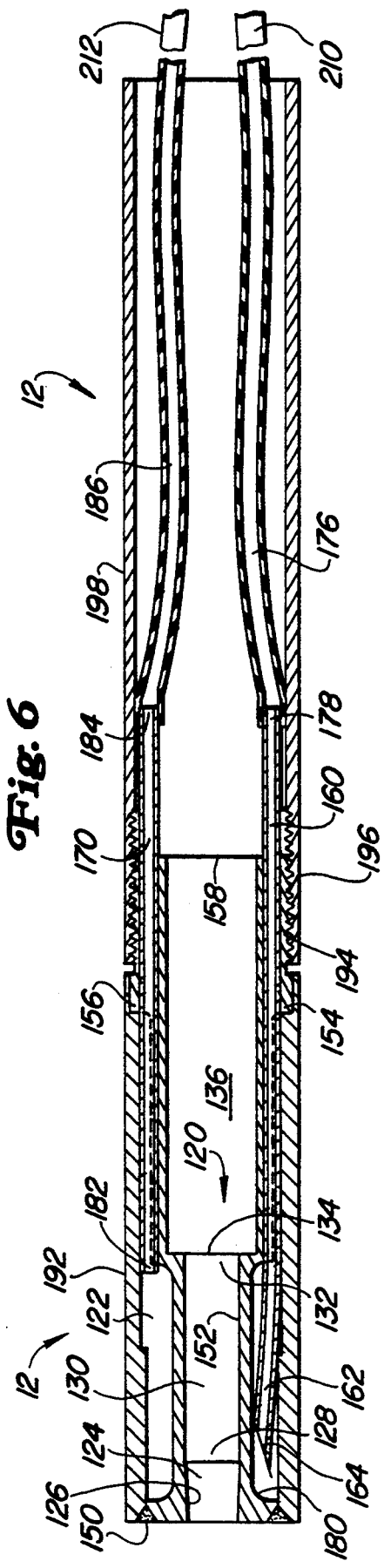

DYNAMIC COMMUTATOR PROFILE SYSTEM

BACKGROUND OF THE INVENTION

This invention relates generally to dynamic profiling systems for measuring a profile of an outer surface of a moving motor component such as a motor commutator and relates more particularly to a computer controlled dynamic profiling system that automatically positions a liquid cooled data collecting probe in close proximity with the outer surface of a rotating motor component.

Large motor components such as commutators are typically used in electrical motors for propulsion systems. The commutators are typically constructed from copper segments or bars laminated and stacked in a circular arrangement so that armature coils may be connected to each of the segments. Each stack is separated by a layer of insulating material so that each stack is electrically isolated from the adjacent stack. The stacked segments form a thick cylinder with the outside surface of the cylinder forming tracks against which multiple fixed brushes contact.

The stacked segments are constructed to create vertical "bars" projecting radially from the center of the commutator and are substantially flush with the outer surface of the cylinder. A large number of vertical bars are evenly spaced around the circumference of the commutator. The number of bars in a commutator typically range from 97 to 250 bars depending upon the physical dimensions of the commutator.

The run-out of the commutator is the physical deformation from bar to bar and is an indication of how the commutator will perform when fitted on armatures and operated in the field. A profile is the measurement of the physical deformation of the bars in the commutator. A profile includes information pertaining to each bar, the bar-to-bar variation, and multiple profiles may be presented in tabular or graphical form. In the past, static and dynamic testing of commutators has been performed.

Conventional static testing systems generally use a mechanical probe or proximity probe to measure the run-out of the commutator along a brush track. The commutator is slowly rotated either manually or mechanically at approximately one to two revolutions per minute. A probe is aligned against the outer surface of the slowly rotating commutator by an operator and a strip chart output is created reflecting the variation from bar to bar. The strip chart output is analyzed and any particular bar showing an abnormal amount of variation is mechanically reduced so as to conform to required parameters. The static test is then repeated to determine if the run-out variation is within acceptable parameters. This process is repeated until all of the bars are within specification.

A problem arises with static testing since it is slow and typically labor intensive. Additionally, static profiling does not indicate how the commutator will react at various speeds and at various temperatures. Since static profiling only yields profile information when the commutator is essentially stationary and at ambient temperature, physical variations and defects apparent during rotational rates experienced in the field cannot be detected. Additionally, static profiling does not provide an indication of how the different brush tracks react at various speeds and temperatures, nor is there any indication of what effect these variations could have on motor performance. Thus, static testing does not provide a true indication of how the commutator will perform in this field.

To address some of the deficiencies associated with static profile testing, manual dynamic profiling has been employed and is well known in the art. Typically, under manual dynamic testing, the commutator is rotated at approximately 2940 revolutions per minute. However, the commutator may be rotated at rates up to 4000 revolutions per minute. Once the commutator is rotating at the required speed, a profile is measured with a proximity probe while the commutator is at ambient temperature.

Manual dynamic profiling systems typically use a proximity probe to produce an electrical signal which is then displayed on an oscilloscope. A photograph is then taken of the oscilloscope trace and various data such as time, date, commutator temperature, commutator speed, and brush track number is hand-written on the photograph. The photographic oscilloscope trace is then analyzed to determine which bars show excessive variation. The bars which do not meet the required specifications are physically reduced and the process is repeated until all of the bars in the commutator are within the required tolerances.

Manual dynamic profiling is superior to static profiling since variations can be detected while the commutator is rotating at speeds representative of normal operating speeds. However, manual dynamic profiling still has serious disadvantages. Manual dynamic profiling requires a dedicated and highly trained operator to calibrate and control the equipment. Once the photographs have been produced, additional engineering personnel are required to interpret the data. This method is extremely time consuming and expensive.

In the past, manual dynamic profiling systems have used computer controlled proximity probes. Most of the proximity probes were adequate for cold profiling (at ambient temperature), however, the proximity probes typically did not function properly and degraded rapidly when subject to the temperatures developed when the commutator was heated. Laser light probes have also been used to gather profile data in a heated environment since close proximity to the heated commutator was not required. However, laser probes have also been unsuccessful due to the effects of the high temperatures on data collection performance.

Methods of cooling the probe while operating in above ambient temperature environments have been developed. Typically, the probe is surrounded by a water bath that is radiantly cooled. The surrounding structure forms a jacket around the probe and is filled with a fixed or static volume of water. The water jacket is cooled by convection and can satisfactorily cool the probe when the temperature of the commutator is maintained below approximately 60° centigrade. When the temperature is increased beyond 60° centigrade, the heat dissipated by the water jacket is typically less than the heat absorbed by the probe. Therefore, the water within the water jacket begins to increases in temperature. However, such systems typically cannot facilitate high temperature testing above the 60° centigrade level. When multiple tests are performed, the operator must recalibrates the equipment to account for the increase in heat since the profile measurements are affected by the increased temperature of the probe. This process is expensive, time consuming, and is prone to inaccuracies. Thus, a need exists for a dynamic profiling device capable of operating at high temperatures such as above 160° centigrade. These high temperatures are closer to the operating temperature of the motor components so that operating condition testing may be facilitated.

Prior art dynamic profiling systems also present potentially dangerous safety hazards. Typically, the commutator is rotated at a rate of 2900 to 4000 revolutions per minute. The combination of high temperature and centrifugal forces created by the high spin rate occasionally cause the commutator to break apart or explode. Should this occur, small fragments and large chunks of the commutator could be ejected at high speeds from the test platform. This poses a serious risk to personnel and property in the test vicinity. Thus, the need exists for a protective environment in which to test the rotating commutator while still allowing for access to the commutator by the probe while the commutator is at high temperatures.

Thus, it is an object of the present invention to provide an automatic dynamic commutator profiling system that substantially overcomes the above problems.

It is another object of the present invention to provide a dynamic commutator profiling system to test a commutator under hot and ambient conditions.

It is still another object of the present invention to provide a computer controlled dynamic commutator profiling system to collect, analyze, and display profiling data.

It is yet another object of the invention to provide a dynamic commutator profiling system with a probe cooling system for maintaining the probe at a fixed temperature when the probe is subject to high temperatures developed when the commutator is heated.

It is a further object of the invention to provide a dynamic commutator profiling system with a probe that is automatically controlled by a controller for positioning along various brush tracks.

It is a yet another object of the invention to provide an improved dynamic commutator profiling system with an aperture, and a controllable door attached to a protective enclosure to allow probe access to the rotating motor component to facilitate high temperature testing.

SUMMARY OF THE INVENTION

The disadvantages of the prior art profiling systems are substantially overcome with the present invention by providing an improved dynamic commutator profiling system that includes a movable probe assembly having a profile detecting probe and a probe cooling system for maintaining a cooling fluid at a fixed temperature during circulation of the cooling fluid. The probe cooling system circulates a cooling fluid, such as water, about the detecting probe. The detecting probe obtains profile measurement data from the outer surface of a moveable motor component, such as a rotating commutator, while the moveable motor component is at ambient temperature and when heated.

A controller controls movement of the probe by horizontally and vertically positioning the probe assembly relative to the moving motor component. Once in the proper position, the probe collects and transmits profile measurement data to the controller. The controller processes the data and graphically displays information for the operator. A variety of data in different formats may be presented such as bar to bar variation, average bar variation, and dynamic run-out. Additionally, the controller can be directed to process the data to provide overlapping displays at hot and ambient temperatures for comparison.

During the test, a protective enclosure covers the rotating commutator under test and forms a sealed enclosure so that the temperature of the commutator may be regulated. A slotted aperture in one wall of the enclosure is configured to allow the probe assembly to approach the rotating commutator by passing through the aperture.

A movable door under controller command selectively blocks and unblocks the aperture to aid in temperature regulation and to allow probe access. A door status signal is generated by a door contact switch and is received by the controller to inform the controller whether the door is open or closed. To open the door, the controller generates a door open request so that the aperture may be unblocked by the door. The status of the door is displayed on a monitor for viewing by the operator.

The probe assembly is moved vertically and horizontally by a probe positioning platform under controller command. The probe assembly is in close proximity with the outer surface of the commutator while the commutator is rotating, and collects profile measurement data for transmission to an analog-to-digital (A/D) converter. The digitized data is then transmitted to the controller for processing and presentation.

The probe positioning platform may be controlled by an auxiliary position control device whereby the probe assembly is directed by an operator to facilitate testing and to save set-up time. The auxiliary position control device may be joy stick, a keyboard, or any other suitable input device capable of allowing an operator to enter commands directly to control the movement of the probe positioning table. However, the controller will disable the auxiliary position control device when the enclosure door is blocking the aperture. This prevents the operator from physically damaging the probe through contact with the enclosure door.

The detecting probe is housed within a water-tight jacket and the probe cooling system circulates a cooling fluid, such as water, about the water-tight jacket that surrounds the detecting probe. The water-tight jacket is configured to fully encapsulate the detecting probe while allowing the data collecting tip of the detecting probe to protrude from the center of the water tight jacket. An inlet pipe having an angled tip extends within the water-tight jacket such that the angled tip of the pipe is proximal to the probe tip. Thus, cooled water is supplied to the inlet pipe and is directed against the inside surface of the water-tight jacket at a point proximal to the probe tip, thus, cooling the probe tip before the water can become heated.

The cooled circulating liquid cools the outer skin of the water-tight jacket which in turn is in contact with the detecting probe. Hence, the detecting probe is maintained at a temperature substantially equal to that of the cooling liquid. Additionally, the controller responds to a flow rate error signal issued by the probe cooling system and halts testing and withdraws the detecting probe from the test enclosure upon detection of the error condition.

BRIEF DESCRIPTION OF THE DRAWINGS

FIG. 3 is a side view of the enclosure shown in FIG. 2, particularly showing the enclosure, the aperture door, and the commutator taken along line 3—3 of FIG. 4 and in the direction generally indicated;

FIG. 4 is a front view of the enclosure as shown in FIG. 3;

FIG. 5 is a side view of the probe positioning platform;

FIG. 6 is a cross-sectional view of the probe jacket and the sleeve additionally showing a noncross-sectional side view of the detecting probe enclosed within;

FIG. 7 is a pictorial view of the probe cooling system in accordance with the invention;

DESCRIPTION OF THE PREFERRED EMBODIMENTS

Figure 1:
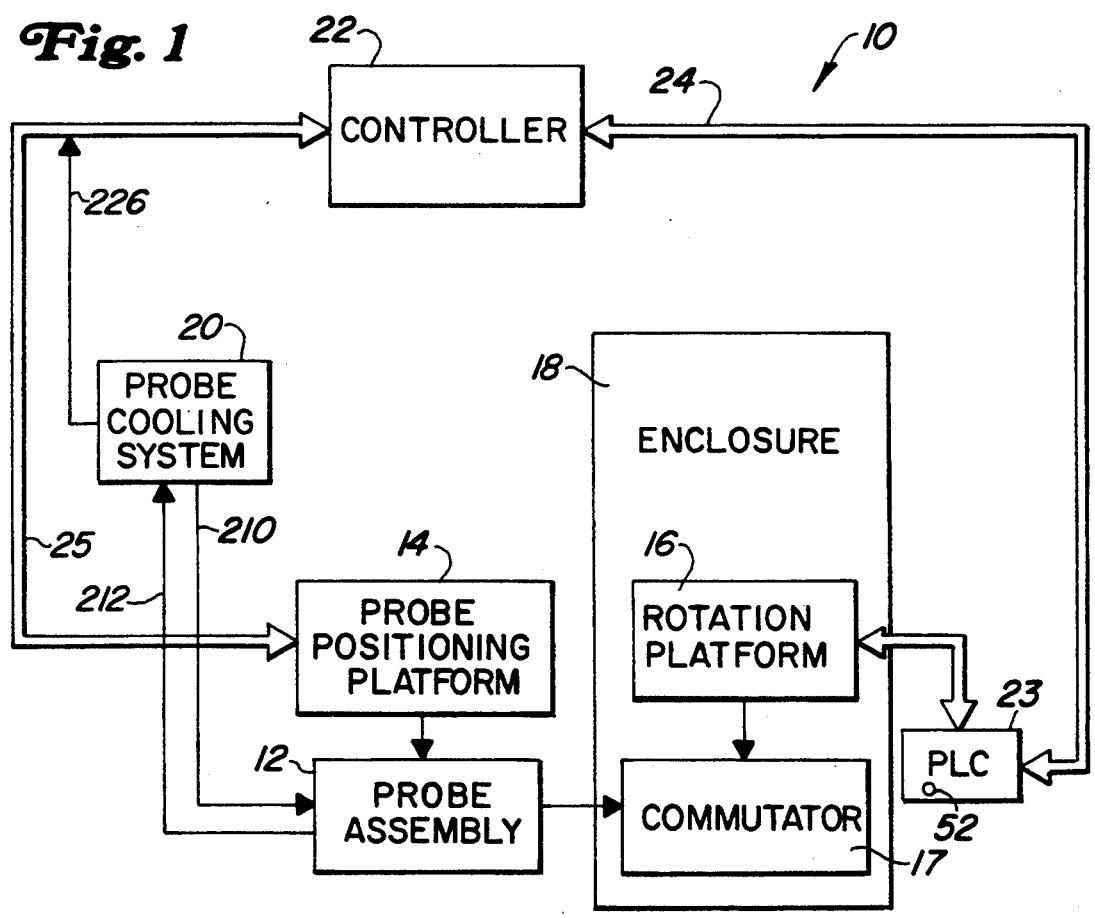
FIG. 1 is a block diagram depicting the major components of the dynamic profiling system in accordance with the invention.

Referring now to FIG. 1, a dynamic commutator profiling system, generally designated as 10, includes a probe assembly 12, and a probe positioning platform 14, a rotation platform 16 for rotating a motor component such as a commutator 17, a protective enclosure 18 for enclosing the commutator 17 under test, a probe cooling system 20, a controller 22, and a programmable logic controller 23 (PLC). The controller 22 communicates with the PLC 23 through a communication link 24, such as a discrete wiring bus. The controller 22 controls various functions of rotation platform 16 and receives various indicator signals from the rotation platform 16 through the communication link 24. Additionally, the controller 22 communicates with the probe positioning platform 14 and the probe cooling system 20 through a communication link 25, such as a discrete wiring bus.

Figure 2:
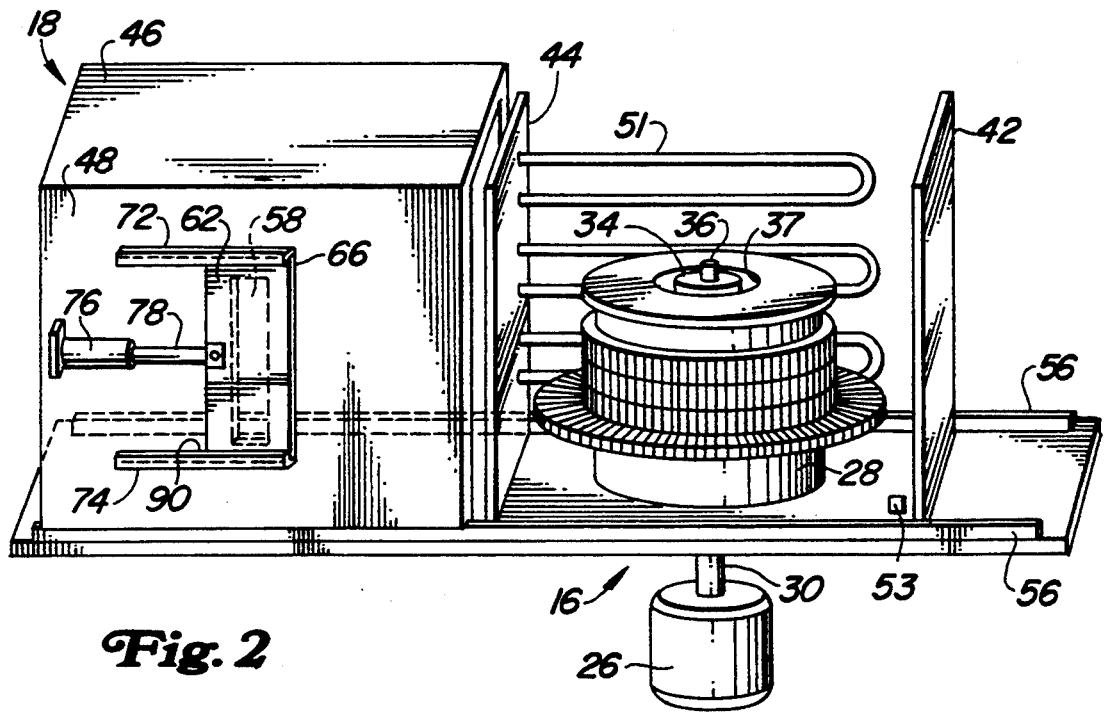
FIG. 2 is an elevational view depicting the rotation platform, the enclosure, and the commutator.

Referring now to FIGS. 1 and 2, the rotation platform 16 is shown generally with the protective enclosure 18 in the non-protective position. The rotation platform 16 provides a stable low vibration environment for operation of the test. A variable speed rotation motor 26, under control of the PLC 23 drives a rotation platter 28 through a shaft 30 and is secured within the platform base by methods well known in the art. A mandril 34 secures the commutator 17 under test to the rotation platter 28. The mandril 34 is secured to a spindle 36 that protrudes through the center of the commutator 17. When the mandril 34 is affixed to the spindle 36, the diameter of the mandril expands slightly against an inside surface 37 of the commutator, thus, securing the commutator to the rotation platter 28. However, any suitable securing mechanism may be used.

The rotation platform 16 is provided with the PLC 23 for receiving signals sent from the controller 22 and for generating signals transmitted to the controller as will be discussed below. The PLC 23 is preferably a General Electric Series 1 controller device as is well known in the art, but any suitable controller may be used.

Referring now to FIGS. 1, 2, and 3, a first fixed sidewall 42 and a second fixed sidewall 44 permanently secured to the rotation platform 16 are provided. In the preferred embodiment, the protective enclosure 18 is shown as a generally "U"-shaped structure and includes a top 46, a first sidewall 48, and a second sidewall 50. The other two sides of the protective enclosure 18 are left open so that the protective enclosure can slide over the rotation platform 16 and engage the two fixed sidewalls 42 and 44 to form a complete enclosure. However, the present invention is not limited to this particular embodiment and alternate methods of providing a protective enclosure are contemplated such as a five-sided enclosure which fits over the rotation platform 16 from above.

The protective enclosure 18 not only acts as a protective shield in the event that the commutator 17 breaks apart or explodes, but also acts as an environmental enclosure so that the temperature within the enclosure can be regulated. Since the commutator 17 must be tested at a variety of temperatures, a heating element 51 is provided and is attached to the second fixed sidewall 44 and extends perpendicularly therefrom. When the enclosure 18 is in the protective position, the area enclosed by the protective enclosure can be heated by the heating element 51 since the chamber is essentially sealed.

The operator manually sets the temperature of the chamber by adjusting a heat setting dial 52 on the PLC 23. A temperature sensor 53 within the chamber transmits the temperature to the PLC 23 which then informs the controller 22 of the temperature within the enclosure 18.

The protective enclosure 18 is fitted with rollers 55 at the bottom of the two sidewalls 48 and 50 such that the enclosure can slide easily from the protective position to an open position to allow an operator to gain access to the commutator 17. The rollers 55 slide along two parallel rails 56 mounted on the top of the rotation platform 16 that are transversely disposed between the two fixed sidewalls 42 and 44. Again, the preferred embodiment is not limited to a rail and roller configuration and other methods for allowing displacement of the enclosure are contemplated.

A slotted rectangular aperture 58 located in the first side wall 48 allows the probe assembly 12 to pass through and gain access to the outer surface 60 of commutator 17 when the enclosure is sealed. The protective enclosure 18 is constructed from one-inch thick steel to protect personnel and property in the event that a commutator explodes or breaks apart while rotating rapidly. The enclosure 18 can withstand the impact from high velocity fragments and will contain all such fragments within the enclosure.

The rectangular aperture 58 is large enough to permit the probe assembly 12 to pass through, while small enough to minimize safety concerns in the event that the commutator 17 breaks apart or explodes. A movable door 62 is provided to selectively block and unblock the aperture 58 so that the temperature of the area enclosed by the enclosure 18 may be regulated and so that the probe assembly 12 may enter the aperture to access the moving commutator 17 as directed by the controller 22.

Referring now to FIG. 4, the door 62 is secured to the outside face 64 of the first sidewall 48 so that the door may be reciprocally moved from the blocking to the non-blocking position. Door tracks 72, 74 secured to the outside face 64 of the first sidewall 48 engages the door 62 securely while allowing the door to move in an horizontal direction as shown by "X" in FIG. 4.

An air cylinder 76 mounted on the outside face 64 of the first sidewall 48 moves the door 62 from the blocking position to the non-blocking position. The air cylinder 76 is attached to the door 62 through a piston 78 which extends and retracts when the air cylinder 76 is activated and deactivated by a supply of compressed air (not shown). The piston 78 extends and retracts approximately two inches, thus, moving the door 62 from the blocking position to the non-blocking position. The air cylinder 76 is responsive to a door control signal (not shown) generated by the PLC under direction from the controller. Thus, the door 62 may be moved into the blocking and non-blocking position under direct control of the controller.

A contact switch 90 is mounted on the outer face 64 of the first sidewall 48 and is activated by the door 62 when the door is moved into the blocking position. The contact switch notifies the PLC which in turn notifies the controller whether the door 62 is in the blocking or non-blocking position.

Referring now to FIG. 5, the probe assembly 12 is mounted on a support plate 94 so that the probe assembly can be positioned along the X and Y axis as shown by "X" and "Y" respectively. An X-stepper motor 96 and a Y-stepper motor 98 are provided to position the support plate 94 in the X and Y directions respectively and are responsive to drive signals generated by the controller. An X over-travel sensor 100 and an Y over-travel sensor 102 provide an indication to the controller that the probe assembly 12 is in the most extended position and is not capable of further advancement in the X and Y directions respectively. The maximum travel in the X or horizontal direction is approximately 18 inches while the maximum travel and the Y or vertical direction is approximately 8 inches. Additionally, an X-home sensor 104 and a Y-home sensor 106 informs the controller when the platform is in the home or fixed reference position. All signals between the controller and the probe positioning platform 14 are transmitted over the communication bus.

Referring now to FIG. 6, the probe assembly 12 is shown generally. The probe assembly 12 includes a profile detecting probe 120 coaxially housed within a water-tight jacket 122. In the preferred embodiment, the detecting probe 120 may be a model number 3401-R01 manufactured by ADE Corporation, Newton, Mass. The detecting probe 120 is a non-contact instrument which measures the relative distance between the probe and an object under test without physically contacting the object.

The detecting probe 120 includes a probe tip 124 that is configured with a 2 to 3 degree taper 126 and is attached to a first end 128 of a probe shaft 130. A second end 132 of the probe shaft 128 is attached to a first end 134 of a probe body 136 such that the probe tip 124, probe shaft, and the probe body form the complete detecting probe 120.

The detecting probe 120 utilizes a capacitive transducer to detect distance. A voltage generated in a coil (not shown) internal to the detecting probe 120 is proportional to the distance between the tip 124 of the detecting probe and any object the distance between which is being measured.

The detecting probe 120 is maintained at a constant temperature of approximately 23° centigrade even when in close and sustained proximity to the commutator 17 (FIG. 2) heated to approximately 160° centigrade. To facilitate cooling of the detecting probe 120, the probe tip 124 and probe shaft 130 are coaxially encapsulated within the water-tight jacket 122. The water-tight jacket 122 is constructed from two layers of brass sheet soldered along a peripheral edge 150 so as to form a hollow contiguous jacket. The surface of the inside wall 152 of the water-tight jacket 122 is complementary in contour to the outside surface of the probe shaft 130 and probe tip 124. The detecting probe 120 snugly fits within the water-tight jacket 122 to provide a high degree of heat exchange between the detecting probe 120 and the water-tight jacket. The detecting probe 120 is coaxially accommodated within the water-tight jacket, however, a portion of the probe tip 124 protrudes from within the water-tight jacket.

The water-tight jacket 122 has an inlet aperture 154 and an outlet aperture 156 located toward the second end 158 of the probe body 136 and are disposed on opposite sides of the water-tight jacket 122. A water supply inlet pipe 160 constructed from ⅛" diameter copper tubing passes through the inlet aperture 154 and extends inside of the water-tight jacket such that a first end 162 of the inlet pipe 160 is proximal to the tip 124 of the detecting probe 120. The junction where the inlet pipe 160 meets the inlet aperture 154 is soldered such that a water-tight seal is maintained. A first end 162 of the inlet pipe 160 enclosed within the water-tight jacket is configured to approximately form a 19° angle 164 relative to the axis of the inlet pipe.

A water supply outlet pipe 170 is similarly constructed from ⅛" diameter copper tubing and passes through the outlet aperture 156. However, the outlet pipe 170 does not fully extend within the water-tight jacket 122. Rather, the outlet pipe 170 only extends into the water-tight jacket to a point where the second end 132 of the probe shaft 130 meets the first end 134 of the probe body 136 so that water flows generally from the probe tip 124 toward the outlet aperture 156. Similarly, the area where the outlet pipe 170 joins the outlet aperture 156 is soldered such that a water-tight seal is maintained.

Cooled water is supplied to the inlet pipe 160 by a plastic water supply inlet tube 176 connected to a second end 178 of the inlet pipe 160. When cooled water enters the water-tight jacket 122 through the inlet pipe 160, the angled tip 164 of the inlet pipe 160 directs the stream of cooled water against an inner surface 180 of the water-tight jacket 122 at a point toward the probe tip 124. This permits the probe tip 124 to be cooled by water before the water becomes heated. As the cooled water circulates within the water-tight jacket 122, the water absorbs heat from the detecting probe 120. The warmed water flows back toward the first end 134 of the probe body 136 and exits the water-tight jacket through a first end 182 of the outlet pipe 170. A second end 184 of the outlet pipe 170 is connected to a plastic water supply outlet tube 186 for recirculation back to the probe cooling system 20.

The detecting probe 120, the water-tight jacket 122, and the inlet 160 and outlet pipes 170 are housed within a short tubular sleeve 192 for physical protection and structural integrity. The inlet and outlet pipes 160 and 170 connect to the plastic water supply tubes 176 and 186. The second end 194 of the short sleeve 192 is threaded and screwably engages a corresponding first end 196 of an extender sleeve 198. The extender sleeve 198 is approximately equal in diameter to the short sleeve 192 and when connected to the short sleeve 192, forms a single assembly. The plastic water supply tubes 176 and 186 and the inlet and outlet pipes 160 and 170 are contained within the extender sleeve and attach to the probe cooling system 20 (described later).

Thus, cooled water enters the water-tight jacket 122 through the plastic inlet tube 176 and the inlet pipe 160 and cools the skin of the water-tight jacket which is in contact with the probe tip 124 enclosed within. The probe tip 124 is maintained at an operating temperature of approximately 23° centigrade while the detecting probe is in proximity with the commutator 17 (FIG. 2) heated to approximately 160° centigrade. Cooled water is continuously supplied to the water-tight jacket 122 and is continuously removed from the water-tight jacket.

Cooling the detecting probe to a fixed temperature of 23° centigrade is crucial to accurate data collection and probe life expectancy. Thus, the present invention overcomes the disadvantage of prior art systems by cooling the detecting probe 120 to a fixed temperature while the detecting probe is exposed to a continuous high temperature environment.

Referring now to FIGS. 6 and 7, the probe cooling system 20 is shown connected to the probe assembly 12 by an inlet coolant hose 210 and an outlet coolant hose 212. Cooled water is supplied by the probe cooling system 20 to the water-tight jacket 122 through the inlet pipe 160, the plastic water supply inlet tube 176, and the inlet coolant hose 210. Similarly, the coolant water is returned to the probe cooling system 20 through the outlet pipe 170, the plastic water supply outlet tube 186, and the outlet coolant hose 212. A refrigeration unit 220 receives the returned coolant water and maintains the temperature of the cooled water as directed by a temperature control device 222 and is manually set by the operator to maintain a temperature of 23° centigrade. The probe cooling system is preferably a COOL FLOW model CFT-33 manufactured by Neslab Instruments Incorporated, however, other suitable cooling systems are contemplated.

A flow rate monitor 224 monitors the rate of flow of cooled water returned from the probe assembly 12. If the water-tight jacket 122 develops a leak, or if any of the inlet or outlet pipes 160, 170 or plastic inlet or outlet tubes 176, 186 become blocked, the rate of flow of the cooling water will fall below a preset threshold. Upon detecting this condition, the flow rate monitor 224 transmits a water flow rate error signal 226 to the controller 22 (FIG. 1). Upon receiving the flow rate error signal 226, the controller 22 (FIG. 1) automatically withdraws the probe assembly 12 and terminates the test. Additionally, the controller 22 generates an indication of this failure condition and displays the failure to the operator.

Figure 8:
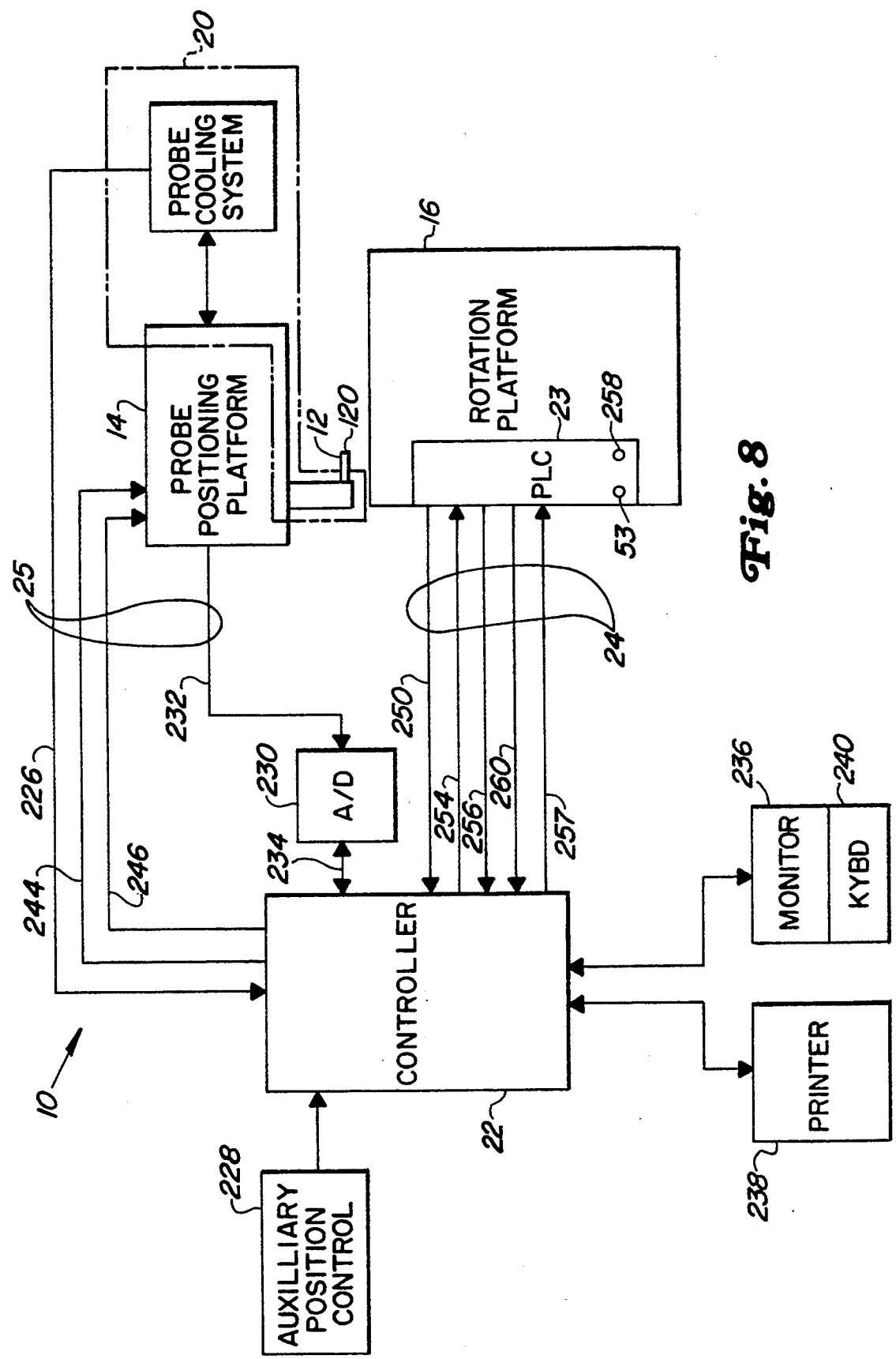
FIG. 8 is combined block diagram and pictorial diagram of the dynamic profiling system in accordance with invention.

Referring now to FIG. 8, a block diagram of the dynamic profiling system 10 is shown. The system 10 also includes an auxiliary position control 228 such as a joystick device, keyboard or any suitable manual control mechanism. The auxiliary position control 228 allows the operator to manually control the position of the probe assembly 12 by directly controlling the probe positioning platform 14. Thus, the operator can quickly position the probe assembly 12 close to the commutator 17 to save set-up time.

The controller 22 will not allow the auxiliary position control 108 to move the probe assembly 12 when the door 62 (FIG. 2) is blocking the aperture 58 (FIG. 2). Thus, the controller 22 will disable the auxiliary position control device 228 to prevent damage to the probe assembly 12 by physical contact with the door 62 (FIG. 2).

In operation, the detecting probe 120 collects profile data in analog form and transmits the profile data to an analog to digital converter 230 through A/D input line 232. The analog to digital converter 230 converts the analog profile data into digital form and transmits the data to the controller 22 through A/D output line 234.

The controller 22 may be a microcomputer, such as a 486 microprocessor based system, with memory such as disk drives (not shown), parallel and serial communication boards (not shown), a VGA monitor 236, a color printer 238, and a keyboard 240. However, the present invention is not limited to this particular embodiment and other controllers or computer systems may also be used.

The controller 22 accepts the data provided by the analog to digital converter 230. The data is analyzed and processed by the controller 22 and the results are displayed in graphical or tabular form on the monitor 236 or printer 238. The controller displays the bar to bar variation, the maximum run-out, and the maximum variation for 20 consecutive bars. Additionally, the controller 22 displays the data at different temperatures and graphically overlays the results. Up to three different tests may be overlayed, such as test data measured at ambient temperature overlayed with test data measured at hot temperatures. Overlaying the test results taken at different temperatures facilitates detecting commutator defects since many defects are apparent only when the commutator is exposed to varying temperatures.

Prior to operation of the dynamic profiling system 10, the operator enters specific commutator characteristics through the keyboard 240. For example, commutator height, diameter, and number of segments or bars are entered. Additionally, the operator enters administrative information such as security passwords and test identification codes. The operator also enters the number of profile sets to be taken, temperatures at which the profile sets will be taken, heating requirements, heating and cool-down time delays, and the number of brush tracks for which to collect data. Each brush track requires that the probe positioning platform 14 raise or lower the probe assembly 12 in a vertical direction so that the detecting probe 120 is aligned with the particular brush track.

The controller 22 is connected to the probe positioning platform 14 by an X motor control line 244 and a Y motor control line 246. These control lines supply the drive signals to the X motor 96 (FIG. 5) and the Y motor 98 (FIG. 5) in the probe positioning platform 14 so that the probe assembly 12 can be positioned.

Referring now to FIGS. 3 and 8, a vibration sensor 248 provides an indication (not shown) to the PLC 23 if excessive vibration is detected. Once the PLC 23 receives the indication, the PLC transmits an excessive vibration signal 250 to the controller 22 for corrective action. Excessive vibration may be caused by a defective commutator 17, improper mounting of the commutator, or failure of a structural component in the rotation platform 16. Since the commutator 17 under test may rotate up to 4000 revolutions per minute, excessive vibration can be extremely dangerous if not detected and corrected. If the controller 22 receives the excessive vibration signal 250, the controller stops the test and informs the operator.

The controller 22 generates a door open request signal 254 which is received by the PLC 23. The PLC 23 in turn, controls the air cylinder 76 secured to the first sidewall 48. When the door open request 254 is received by the PLC 23, the PLC directs the air cylinder 76 to open the door 62, thus, unblocking the aperture 58. The PLC 23 generates a door status signal 256 in response to the door contact switch 90 and transmits the door status signal to the controller 22 for display on the monitor 236. Thus, the controller 22 has complete control over the door 62 and the aperture 58.

Additionally, the controller 22 receives a temperature indication signal 257 from the PLC 23. The PLC 23 receives temperature data from the temperature sensor 53 mounted within the enclosure 18 and transmits the temperature indicator signal 257 to the controller 22.

The PLC 23 is connected to the rotation platform 16 and acts as an interface for all signals transmitted between the controller 22 and the rotation platform 16. Additionally, the PLC 23 controls the rate of rotation of the rotation motor 26 mounted within the rotation platform 16. The rate of rotation is manually set by the operator through use of a rotation control actuator 258. In response to the manual setting, the PLC 23 directs the rotation motor 26 to rotate at the proper speed. The rate of rotation is measured by the PLC 23, and a rate of rotation signal 260 is transmitted to the controller 22.

Figure 9:
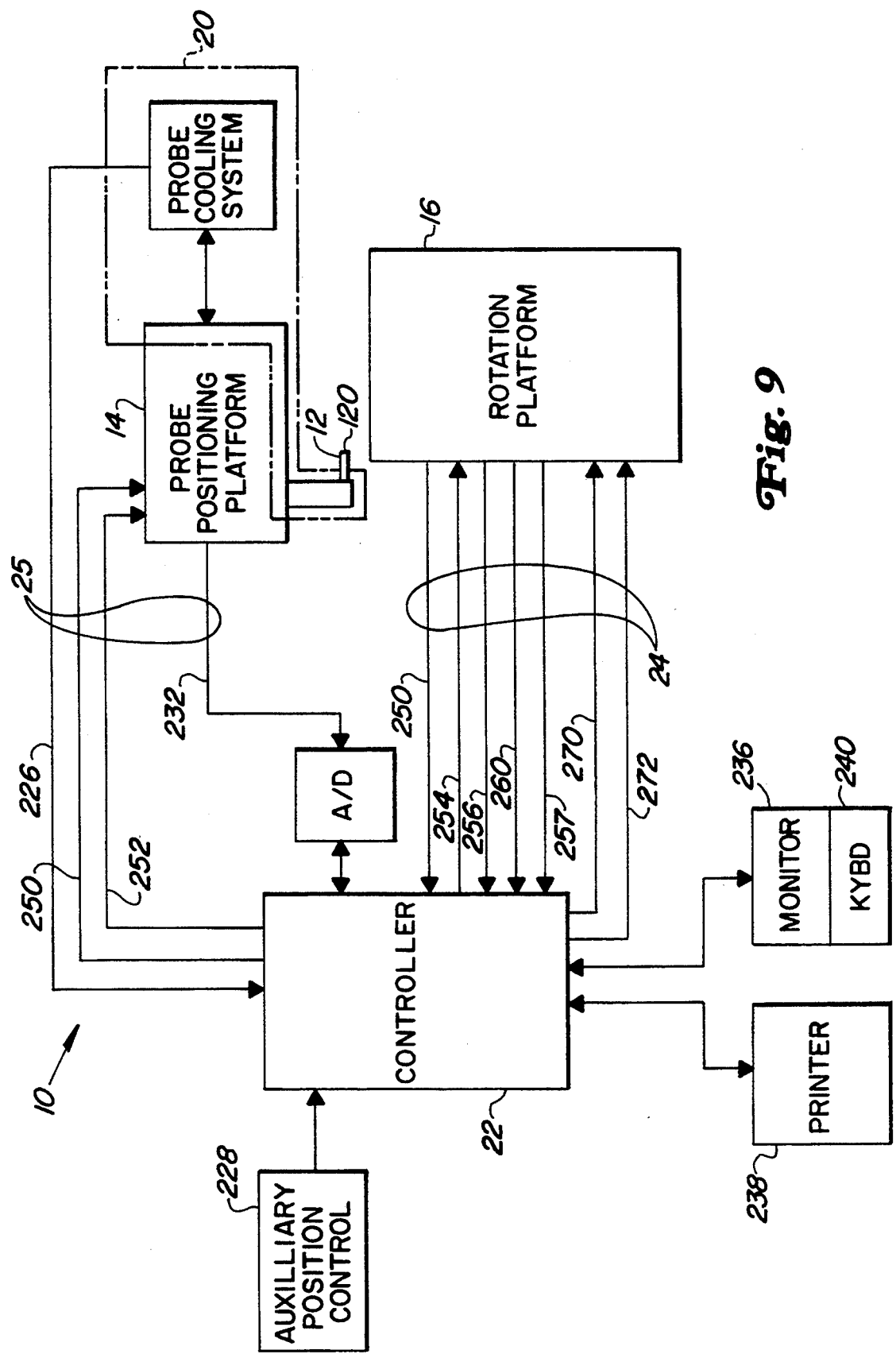
FIG. 9 is combined block diagram and a pictorial diagram of the dynamic profiling system depicting an alternate embodiment of the invention.

Referring now to FIG. 9, an alternate embodiment is shown and is similar to the preferred embodiment as shown in FIG. 8. However, the PLC is absent in this embodiment and the controller 22 controls all signals sent to the rotation platform 16 and receives all signals generated by the switches and sensors on the rotation platform. Thus, the door status signal 256, the excessive vibration signal 250, the rate of rotation signal 260, and the temperature indication signal 257 are received directly by the controller 22. Accordingly, the controller 22 directly controls the rate of rotation of the rotation platform 16 through a rotation command signal 270 and regulates the temperature within the enclosure through a temperature control signal 272. Thus, the controller 22 has complete control over the rotation platform 16.

While various embodiments of the present dynamic profiling system have been shown and described, it will be appreciated by those skilled in the art that changes and modifications may be made thereto without departing from the spirit and scope of the invention and its broader aspects as set forth in the following claims.

What is claimed is:

1. A dynamic profiling system for measuring a profile of an outer surface of a moving motor component, the profiling system comprising:
   a moveable probe assembly having a profile detecting probe; and
   a probe cooling system for circulating a cooling liquid about the detecting probe and to maintain the cooling liquid at a fixed temperature during circulation of the cooling liquid wherein the detecting probe obtains profile measurement data from the outer surface of the moving motor component when the motor component is heated.

2. The profiling system as defined in claim 1 wherein the probe assembly further comprises:
   a tubular enclosure;
   a liquid-tight jacket having a forward end, the jacket being coaxially accommodated within the tubular enclosure;
   the jacket having an inlet aperture for accepting the cooling liquid and an outlet aperture for removing the cooling liquid wherein the cooling liquid is supplied to the liquid-tight jacket for controlling the temperature of the detecting probe contained therein; and
   the profile detecting probe having a probe tip, the profile detecting probe being coaxially accommodated within the liquid-tight jacket, the probe tip being disposed toward the forward end of the liquid-tight jacket.

3. The profiling system as defined in claim 2 wherein the water-tight jacket is a contiguous structure coaxially surrounding at least a portion of the probe tip.

4. The profiling system as defined in claim 2 further comprising:
   an inlet pipe having an angled tip;
   the inlet pipe extending within the water-tight jacket such that the angled tip is proximal to the forward end of the water-tight jacket for directionally supplying the cooling liquid to the forward end of the water-tight jacket.

5. The profiling system as defined in claim 2 wherein the detecting probe further comprises:
   a capacitative transducer for measuring the distance from the detecting probe to the outer surface of the moving motor component.

6. The profiling system as defined in claim 1 wherein the probe cooling system further comprises:
   means for cooling the cooling liquid to a fixed temperature;
   means for monitoring the flow rate of the cooling liquid supplied to the detecting probe to maintain the detecting probe at a substantially fixed temperature; and
   control means responsive to the flow rate monitoring means, for withdrawing the detecting probe from the motor component when the flow rate is beyond a predetermined threshold.

7. The profiling system as defined in claim 6 wherein the probe cooling system maintains the temperature of the detecting probe at approximately twenty-three degrees centigrade.

8. A dynamic profiling system for measuring a profile of an outer surface of a moving motor component, the profiling system comprising:
   a moveable probe assembly having a profile detecting probe;
   a probe cooling system for circulating a cooling liquid about the detecting probe and to maintain the cooling liquid at a fixed temperature during circulation of the liquid wherein the detecting probe obtains profile measurement data from the outer surface of the moving motor component when the motor component is heated;
   control means for processing the profile measurement data collected by the detecting probe and for controlling the position of the probe assembly;
   a rotation platform having a base and a rotation means for rotating the motor component;
   means for enclosing the moving motor component;
   an aperture, defined by an opening in the enclosure means, configured to allow the probe assembly to approach the moving motor component by passing through the aperture;
   a movable door for selectively blocking the aperture; and
   door sensing means for generating a door status signal to indicate to the control means whether the aperture is blocked or unblocked by the door.

9. The profiling system as defined in claim 8 wherein the control means is responsive to the door status signal and generates a visual indication of the door status signal in response thereto.

10. The profiling system as defined in claim 8 further comprising:
an auxiliary position control means, responsive to the door status signal for positioning the probe assembly relative to the moving motor component wherein the auxiliary position control means is disabled by the control means so that the probe assembly will not pass through the aperture when the door is blocking the aperture.

11. The profiling system as defined in claim 8 wherein the enclosure means further comprises:
a temperature control means for heating the area enclosed by the enclosure means.

12. The profiling system as defined in claim 8 further comprising:
a probe positioning means for positioning the probe assembly relative to the moving motor component.

13. The profiling system as defined in claim 12 wherein the probe positioning means further comprises:
an X-Y table for securing the probe assembly;
a first motor for positioning the probe assembly longitudinally in the X direction and responsive to a first drive signal generated by the control means; and
a second motor for positioning the probe assembly vertically in the Y direction responsive to a second drive signal generated by the control means.

14. The profiling system as defined in claim 8 further comprising:
an analog to digital converter for converting the profile measurement data collected by the profile detecting probe into digital data for transmission to the control means for processing.

15. A dynamic profiling system for measuring a profile of an outer surface of a moving motor component, the profiling system comprising:
a movable probe assembly having a profile detecting probe;
a probe cooling system for circulating a cooling liquid about the detecting probe and to maintain the cooling liquid at a fixed temperature during circulation of the cooling liquid wherein the detecting probe obtains profile measurement data from the outer surface of the moving motor component when the motor component is heated;
control means for processing the data collected by the profile detecting probe and for controlling the position of the probe assembly;
an analog to digital converter for converting the data collected by the detecting probe into digital data and for transmitting the data to the control means for processing;
visual display means for providing information processed by the control means;
probe positioning means for positioning the probe assembly relative to the moving motor component;
auxiliary position control means for manually positioning the probe assembly relative to the moving motor component;
a rotation platform having a base and a rotation means for rotating the motor component;
means for enclosing the moving motor component wherein the enclosure means releasably attaches to the rotation platform;
an aperture defined by an opening in the enclosure means configured to allow the probe assembly to approach the moving motor component by passing through the aperture;
a movable door for selectively blocking the aperture;
door sensing means for generating a door status signal to indicate to the control means whether the aperture is blocked or unblocked by the door; and
the control means being responsive to the door status signal and for generating a visual indication of the door status signal in response thereto.

16. The profiling system as defined in claim 15 wherein the control means further comprises:
a door open request signal generated by the control means and received by a door actuating means and responsive thereto.

17. The profiling system as defined in claim 15 wherein the control means further comprises:
a cooling liquid flow rate error signal issued by the probe cooling system and received by the control means;
an excessive vibration signal issued by the rotation platform and received by the control means;
a rate of rotation signal issued by the rotation platform and received by the control means; and
a temperature indication signal issued by the rotation platform and received by the control means.

18. The profiling system as defined in claim 15 further comprising:
an auxiliary position control means, responsive to the door status signal for positioning the probe assembly relative to the moving motor component such that the auxiliary position control means is disabled by the controller so that the probe assembly will not pass through the aperture when the door is blocking the aperture.

19. The profiling system as defined in claim 15 wherein the control means generates graphical and tabular representations of the data collected by the detecting probe and at different temperatures for display to an operator.

20. The profiling system as defined in claim 19, wherein the graphical representation of the data collected by the detecting probe at hot and ambient temperatures may be overlayed and viewed on the display.

* * * * *